July 28, 1925.
S. G. RUSSELL ET AL
1,547,238
FISHING REEL
Filed Dec. 1, 1924
2 Sheets-Sheet 1
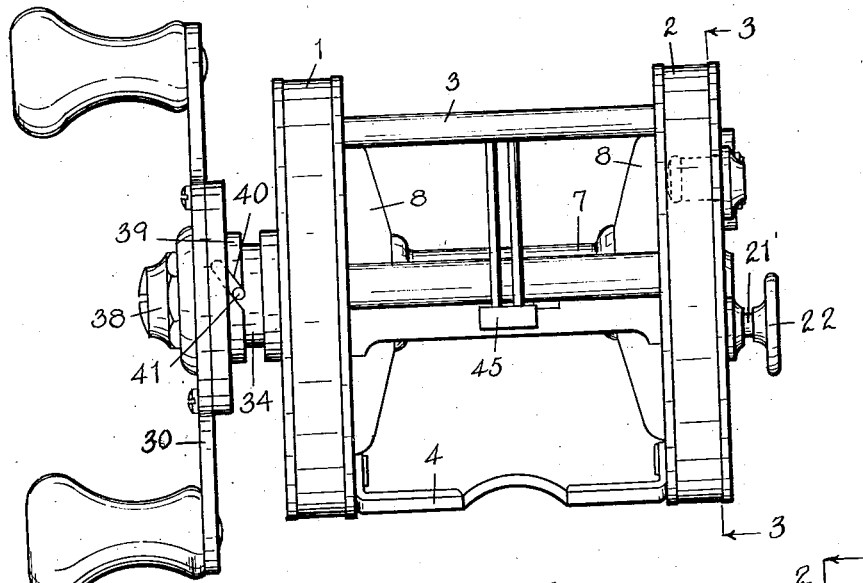
Fig. I.
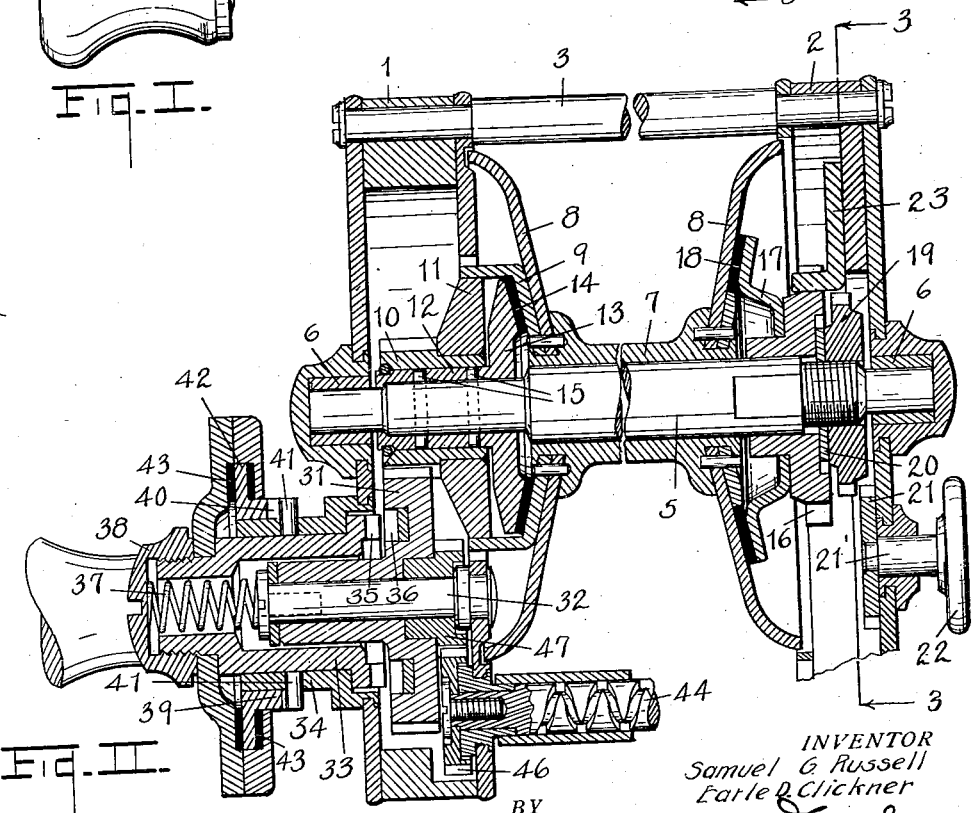
Fig. II.
INVENTOR
Samuel G. Russell
Earle D. Clickner
BY
Chappell & Earl
ATTORNEYS July 28, 1925.
S. G. RUSSELL ET AL
1,547,238
FISHING REEL
Filed Dec. 1, 1924
2 Sheets-Sheet 2
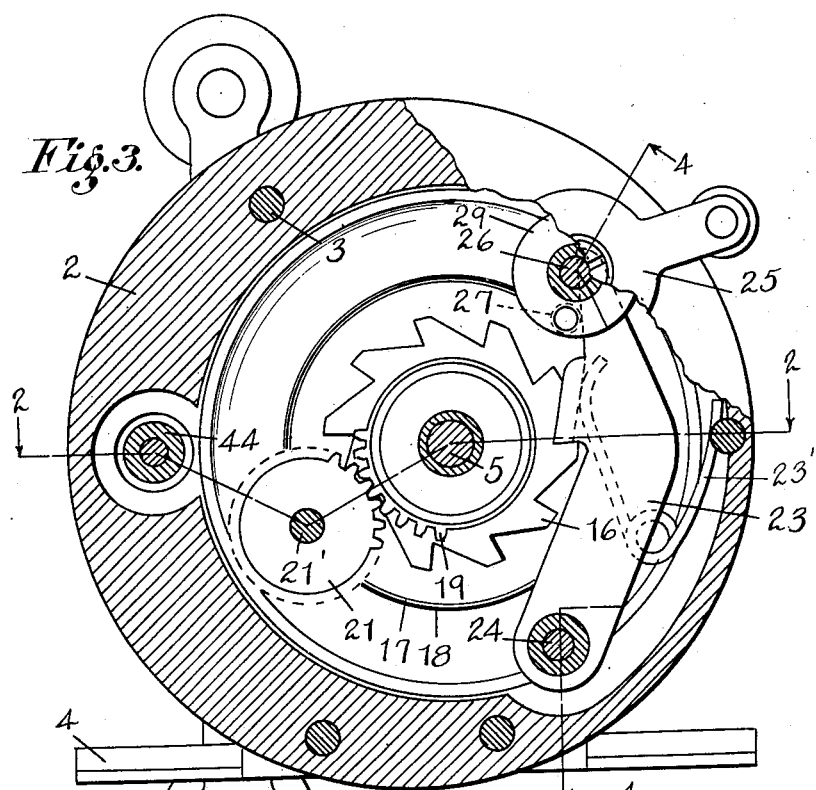
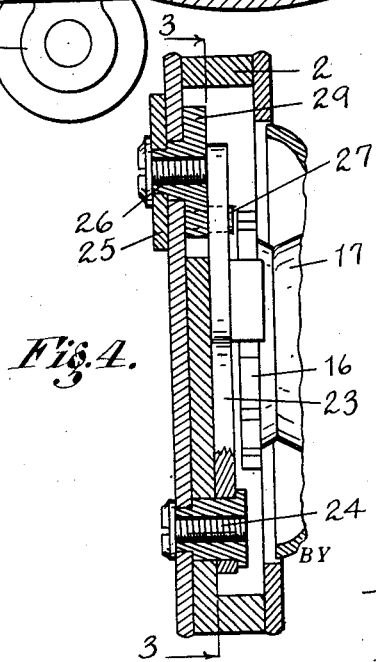
INVENTOR
Samuel G. Russell
Earle D. Clickner
BY
Chappell & Earl
ATTORNEYS Patented July 28, 1925.

1,547,238

UNITED STATES PATENT OFFICE.

SAMUEL G. RUSSELL AND EARLE D. CLICKNER, OF KALAMAZOO, MICHIGAN, ASSIGNORS TO SHAKESPEARE COMPANY, OF KALAMAZOO, MICHIGAN.

FISHING REEL.

Application filed December 1, 1924. Serial No. 753,227.

*To all whom it may concern:*

Be it known that we, SAMUEL G. RUSSELL and EARLE D. CLICKNER, citizens of the United States, residing at the city and county of Kalamazoo, State of Michigan, have invented certain new and useful Improvements in Fishing Reels, of which the following is a specification.

This invention relates to improvements in fishing reels.

Our improvements are especially designed by us for embodiment in reels of large size to be used for ocean and deep water fishing although desirable and readily adapted to small reels.

The main objects of this invention are:

First, to provide an improved fishing reel of the free running spool type with improved means for frictionally braking the spool.

Second, to provide a reel of the level winding type having the above advantages.

Third, to provide an improved fishing reel which is capable of withstanding very heavy loads.

Objects pertaining to details and economies of construction and operation of our invention will definitely appear from the detailed description to follow.

We accomplish the objects of our invention by the devices and means described in the following specification. The invention is clearly defined and pointed out in the claims.

A structure embodying the features of our invention is clearly illustrated in the accompanying drawing forming a part of this application, in which:

Fig. I is a front elevation of a fishing reel embodying the features of our invention.

Fig. II is a detail section on a line corresponding to the broken line 2—2 of Fig. III.

Fig. III is a section on a line corresponding to line 3—3 of Figs. I, II, and IV.

Fig. IV is a detail section on a line corresponding to broken line 4—4 of Fig. III showing details of the brake controlling means.

In the drawings the sectional views are taken looking in the direction of the little arrows at the ends of the section lines and similar numerals of reference indicate similar parts in all of the views.

We provide a frame consisting of the chambered head and tail members 1 and 2 connected by the pillar 3 and the reel seat member 4. The shaft 5 is journaled in bearings 6 carried by the end plates of the frame.

The spool comprises a barrel 7 rotatably mounted upon the shaft 5, the barrel having spool flanges 8 secured thereto. Secured to one end of the spool is a drum 9 providing connection for the spool pinion 10 to the spool. The spool pinion has a flange 11 secured thereto and to the rim of the drum so that the spool pinion and the spool rotate together.

The spool pinion is mounted upon the hub 12 of the brake member 13, this brake member having a friction shoe 14 coacting with the drum. The hub of this brake member is secured to the shaft 5 by the pins 15. At the other end of the shaft is a ratchet member 16 which is splined to the shaft so that it rotates therewith.

A brake member 17 is secured to this ratchet member and has a friction shoe 18 coacting with the flange of the spool. The ratchet member 16 is adjustably supported by means of the gear 19 which is threaded upon the end of the shaft, a washer 20 being arranged between the gear 19 and the ratchet 16.

The brake members 17 and 13 are disposed in opposed relation so that by turning the member 19 the friction of both brake members is adjusted. We provide an adjusting pinion 21 which is carried by a spindle 21' supported for axial and rotative movement in the end plane of the frame, the spindle having a finger piece 22 at its outer end. This enables the pinion 21 being adjusted into mesh with the adjusted member 19 by axial movement of the spindle, when the member 19 may be rotated to secure the desired friction between the brake members and the spool, which should be under that of the strength of the line.

With the parts thus arranged, by locking the shaft against rotation through the locking ratchet 16, the brake members are non-rotatably supported, frictionally holding the spool.

In the embodiment illustrated we provide a holding pawl 23 which is pivoted on the frame at 24 to coact with the ratchet, the pawl being held in inoperative position by means of the control lever 25 which is pivoted at 26 and has a pin 27 engaging the end of the pawl. The pawl 23 is urged to engaging position by the spring 23'. This lever 25 is arranged on the outside of the frame, its pivot 26 being arranged through the frame and carrying a disk 29 on which the pin 27 is mounted.

The spool pinion 10 is connected to the crank 30 through the driving gear 31, this gear 31 being arranged on the stub shaft 32 to mesh with the spool pinion. The crank 30 is mounted for limited axial movement and has a hub 33 projecting into the bearing 34 on the reel frame. On the inner end of this hub is a toothed driving member 35 adapted to coact with a toothed driving member 36 on the side of the gear 31.

The coiled spring 37 disposed between the end of the shaft 32 and the cap 38 on the crank hub urges the crank outwardly or to disengaging position. An annular member 39 having cam slots 40 therein is mounted upon the bearing 34 with the slots in engagement with the pins 41. These cam slots are inclined so that on the forward rotation of the crank the clutch member 35 of the crank is thrown into engagement with the clutch member 36 of the driving gear.

The cam member 39 has a peripheral flange 42 engaged by the friction rings 43 so that the cam member is frictionally connected to the crank, it being intended that it shall rotate with the crank until stopped by pins 41 striking the ends of slots 40. The friction connection is provided to allow the continued rotation of the crank for winding the line.

The traversing shaft 44 is mounted in the frame to coact with the line guide carriage 45. A pinion 46 is secured to the traversing shaft and arranged in mesh with a pinion 47 connected to the driving gear. With this driving connection the traversing shaft is driven with the spool.

Our improved fishing reel is especially designed for heavy work such as deep sea fishing. The reel may be quickly adjusted to render the spool brakes operative or inoperative and the parts are arranged so that the braking stress does not place the moving or working parts under an unbalanced strain.

We have illustrated and described our improvements as embodied in reels for ocean and deep water fishing but it is believed the disclosure made will enable those skilled in the art to embody and adapt our improvements as may be desired.

Having thus described our invention what we claim as new and desire to secure by Letters Patent is:

1. In a fishing reel, the combination of a frame, a shaft journaled in said frame, a spool rotatable on said shaft, a drum secured to one end of said spool, a spool pinion connected to said drum to rotate therewith and rotatably associated with one end of said shaft, a ratchet member splined to the other end of said shaft, friction brake members disposed in opposed relation, one being secured to said shaft to coact with said drum and the other being secured to said ratchet member coacting with the spool, a manually adjusted holding pawl mounted on said frame to coact with the said ratchet whereby the shaft may be held against rotation, a crank mounted for axial movement and provided with a driving member adapted to engage said driving gear when the crank is moved inwardly, a cam for moving said crank inwardly on the forward rotation of the crank, said cam having friction driving connection to said crank, and a spring for returning said crank to its disengaged position.

2. In a fishing reel, the combination of a frame, a shaft journaled in said frame, a spool rotatable on said shaft, a drum secured to one end of said spool, a spool pinion connected to said drum to rotate therewith and rotatably associated with one end of said shaft, a ratchet member splined to the other end of said shaft, friction brake members disposed in opposed relation, one being secured to said shaft to coact with said drum and the other being secured to said ratchet member coacting with the spool, a manually adjusted holding pawl mounted on said frame to coact with the said ratchet whereby the shaft may be held against rotation, and a crank operatively connected to said spool pinion.

3. In a fishing reel, the combination of a frame, a shaft journaled in said frame, a spool rotatable on said shaft, a drum secured to one end of said spool, a spool pinion connected to said drum to rotate therewith and rotatably associated with one end of said shaft, a ratchet member splined to the other end of said shaft, friction brake members disposed in opposed relation, one being secured to said shaft to coact with said drum and the other being secured to said ratchet member coacting with the spool, a manually adjusted holding pawl mounted on said frame to coact with the said ratchet whereby the shaft may be held against rotation, an adjusting gear threaded upon said shaft to engage said ratchet whereby the friction of the brake members may be adjusted, an adjusting pinion provided with a finger piece and adapted to be adjusted into and out of engagement with said adjusting gear, and a crank operatively connected to said spool pinion.

4. In a fishing reel, the combination of a frame, a shaft journaled in said frame, a spool rotatable on said shaft, a drum secured to one end of said spool, a spool pinion connected to said drum to rotate therewith and rotatably associated with one end of said shaft, friction brake members disposed in opposed relation, one being secured to said shaft to coact with said drum, and the other secured to said ratchet member coacting with the spool, a manually adjusted means for holding said shaft against rotation, a traversing shaft, a pinion on said traversing shaft, a driving gear meshing with said spool pinion, a traversing shaft driving pinion connected to said driving gear and meshing with said traversing shaft pinion, a crank mounted for axial movement and provided with a driving member adapted to engage said driving gear when the crank is moved inwardly, a cam for moving said crank inwardly on the forward rotation of the crank, said cam having a friction driving connection to said crank, and a spring for returning said crank to its disengaged position.

5. In a fishing reel, the combination of a frame, a shaft journaled in said frame, a spool rotatable on said shaft, a drum secured to one end of said spool, a spool pinion connected to said drum to rotate therewith and rotatably associated with one end of said shaft, friction brake members disposed in opposed relation, one being secured to said shaft to coact with said drum and the other being secured to said ratchet member coacting with the spool, a manually adjusted means for holding said shaft against rotation, a traversing shaft, a pinion on said traversing shaft, a driving gear meshing with said spool pinion, a traversing shaft driving pinion connected to said driving gear and meshing with said traversing shaft pinion, and a crank for said driving gear.

6. In a fishing reel, the combination of a frame, a shaft journaled in said frame, a spool rotatable on said shaft, a drum secured to one end of said spool, a ratchet member splined to said shaft, friction brake members disposed in opposed relation, one being secured to said shaft to coact with said drum and the other being secured to said ratchet member coacting with the spool, a manually adjusted holding pawl mounted on said frame to coact with the said ratchet whereby the shaft may be held against rotation, an adjusting member threaded upon said shaft to engage said ratchet whereby the friction of the brake members may be adjusted, and a crank operatively connected to said spool.

7. In a fishing reel, the combination of a frame, a shaft journaled in said frame, a spool rotatable on said shaft, a spool pinion connected to said spool to rotate therewith and rotatably associated with said shaft, a friction brake member connected to said shaft to rotate therewith and coacting with said spool, a ratchet on said shaft, a manually adjusted holding pawl mounted on said frame to coact with said ratchet whereby the shaft may be held against rotation, a traversing shaft, a pinion on said traversing shaft, a driving gear meshing with said spool pinion, a traversing shaft driving pinion connected to said driving gear and meshing with said traversing shaft pinion, a crank mounted for axial movement and provided with a driving member adapted to engage said driving gear when the crank is moved inwardly, means for moving said crank inwardly on the forward rotation of the crank, and a spring for returning said crank to its disengaged position.

8. In a fishing reel, the combination of a frame, a shaft journaled in said frame, a spool rotatable on said shaft, a spool pinion connected to said spool to rotate therewith and rotatably associated with said shaft, a friction brake member connected to said shaft to rotate therewith and coacting with said spool, a ratchet on said shaft, a manually adjusted holding pawl mounted on said frame to coact with said ratchet whereby the shaft may be held against rotation, a driving gear meshing with said spool pinion, a crank mounted for axial movement and provided with a driving member adapted to engage said driving gear when the crank is moved inwardly, means for moving said crank inwardly on the forward rotation of the crank, and a spring for returning said crank to its disengaged position.

9. In a fishing reel, the combination of a frame, a shaft journaled in said frame, a spool rotatable on said shaft, a spool pinion connected to said spool to rotate therewith and rotatably associated with said shaft, a friction brake member connected to said shaft to rotate therewith and coacting with said spool, a ratchet on said shaft, a manually adjusted holding pawl mounted on said frame to coact with said ratchet whereby the shaft may be held against rotation, a traversing shaft, a pinion on said traversing shaft, a driving gear meshing with said spool pinion, a traversing shaft driving pinion connected to said driving gear and meshing with said traversing shaft pinion, and a crank for said driving gear.

10. In a fishing reel, the combination of a frame, a shaft journaled in said frame, a spool rotatable on said shaft, a spool pinion connected to said spool to rotat therewith and rotatably associated with said shaft, a friction brake member connected to said shaft to rotate therewith and coacting with said spool, a ratchet on said shaft, a manually adjusted holding pawl mounted on said frame to coact with said ratchet whereby the shaft may be held against rotation, a driving gear meshing with said spool pinion, and a crank for said driving gear.

11. In a fishing reel, the combination of a frame, a shaft journaled in said frame, a spool rotatable on said shaft, a spool pinion connected to said spool to rotate therewith and rotatably associated with said shaft, a friction brake member connected to said shaft to rotate therewith and coacting with said spool, a ratchet on said shaft, a manually adjusted holding pawl mounted on said frame to coact with said ratchet whereby the shaft may be held against rotation, a traversing shaft, a pinion on said traversing shaft, a driving gear meshing with said spool pinion, a traversing shaft driving pinion connected to said driving gear and meshing with said traversing shaft pinion, and a crank operatively associated with said driving gear.

12. In a fishing reel, the combination of a frame, a shaft journaled in said frame, a spool rotatable on said shaft, a spool pinion connected to said spool to rotate therewith and rotatably associated with said shaft, a friction brake member connected to said shaft to rotate therewith and coacting with said spool, a ratchet on said shaft, a manually adjusted holding pawl mounted on said frame to coact with said ratchet whereby the shaft may be held against rotation, and a crank operatively associated with said spool.

13. In a fishing reel, the combination of a frame, a shaft journaled in said frame, a spool rotatable on said shaft, a friction brake member connected to said shaft to rotate therewith and coacting with said spool, means for adjusting the said brake member for regulating the friction thereof, a ratchet on said shaft, a manually adjusted holding pawl mounted on said frame to coact with said ratchet whereby the shaft may be held against rotation, and a driving crank operatively associated with said spool.

14. In a fishing reel the combination of a frame, a shaft journaled in said frame, a spool rotatable on said shaft, a friction brake member connected to said shaft to rotate therewith and coacting with said spool, a ratchet on said shaft, a manually adjusted holding pawl mounted on said frame to coact with said ratchet whereby the shaft may be held against rotation, and a driving crank operatively associated with said spool.

15. In a fishing reel, the combination of a frame, a shaft journaled in said frame, a spool rotatable on said shaft, friction brake members connected to said shaft to rotate therewith and disposed to coact with said spool in opposed relation, means for adjusting the said brake members for regulating the friction thereof, a manually actuated means for holding said shaft against rotation, and a driving crank operatively associated with said spool.

16. In a fishing reel, the combination of a frame, a shaft journaled in said frame, a spool rotatable on said shaft, friction brake members connected to shaft to rotate therewith and disposed to coact with said spool in opposed relation, a manually actuated means for holding said shaft against rotation, and a driving crank operatively associated with said spool.

17. In a fishing reel, the combination of a frame, a shaft journaled in said frame, a spool rotatable on said shaft, a drum secured to one end of said spool, a pinion rotatable on said shaft and having a flange connected to said drum, a friction brake member mounted within said drum to coact therewith, manually actuated means for holding said shaft against rotation, and a crank operatively connected to said pinion.

18. In a fishing reel, the combination of a frame, a shaft journaled in said frame, a spool rotatable on said shaft, a crank operatively connected to said spool, a shaft locking member splined to said shaft, a friction brake member mounted on said locking member to coact with said spool, an adjusting member threaded upon said shaft to coact with said locking member, and manually adjusted means mounted on said frame to coact with said locking member for holding the shaft against rotation.

19. In a fishing reel, the combination of a frame, a shaft journaled in said frame, a spool rotatable on said shaft, a crank operatively connected to said spool, a shaft locking member connected to said shaft to rotate therewith, a friction brake member mounted on said locking member to coact with said spool, and manually adjusted means mounted on said frame to coact with said locking member for holding the shaft against rotation.

20. In a fishing reel, the combination of a frame, a shaft journaled in said frame, a spool rotatably mounted on said shaft, a spool pinion connected to said spool to rotate therewith, a brake member mounted on said shaft and operatively associated with said spool, manually operated means for holding said shaft against rotation, a traversing shaft, a driving crank, a driving gear meshing with said pinion and having driving connection to said traversing shaft, and means for automatically engaging said crank with said driving gear on the forward rotation of the crank.

21. In a fishing reel, the combination of a frame, a shaft journaled in said frame, a spool rotatably mounted on said shaft, a spool pinion connected to said spool to rotate therewith, a brake member on said shaft and operatively associated with said spool, manually operated means for holding said shaft against rotation, a traversing shaft, a driving crank, and a driving gear meshing with said pinion and having driving connection to said traversing shaft.

In witness whereof we have hereunto set our hands.

SAMUEL G. RUSSELL. [L. S.]
EARLE D. CLICKNER. [L. S.]